United States Patent [19]

Bunch

[11] 4,218,114
[45] Aug. 19, 1980

[54] HELIOSTAT APPARATUS

[76] Inventor: Jesse C. Bunch, 1008 Kerwin Rd., Silver Spring, Md. 20901

[21] Appl. No.: 892,960

[22] Filed: Apr. 3, 1978

Related U.S. Application Data

[62] Division of Ser. No. 642,473, Dec. 19, 1975, Pat. No. 4,110,009.

[51] Int. Cl.³ .............................................. G02B 5/08
[52] U.S. Cl. .................................. 350/292; 126/438; 350/299; 353/3
[58] Field of Search .................. 126/438, 439, 440; 350/288, 292, 299; 353/3

[56] References Cited

U.S. PATENT DOCUMENTS

| | | | |
|---|---|---|---|
| 509,390 | 11/1892 | Paine | 126/438 X |
| 1,367,472 | 2/1921 | Harvey | 350/292 |
| 1,386,781 | 8/1921 | Harvey | 350/292 UX |
| 2,471,954 | 5/1949 | Harvey | 126/438 X |
| 3,466,119 | 9/1969 | Francio | 350/299 |
| 3,872,854 | 3/1975 | Raser | 126/438 X |
| 3,905,352 | 9/1975 | Jahn | 350/299 X |
| 3,924,604 | 12/1975 | Anderson | 126/438 X |
| 3,985,118 | 10/1976 | Bard | 126/440 X |
| 4,110,009 | 8/1979 | Bunch | 350/299 X |

*Primary Examiner*—F. L. Evans
*Attorney, Agent, or Firm*—Morton J. Rosenberg

[57] ABSTRACT

Heliostat apparatus for concentrating solar energy comprising support structure disposed in a first plane and supporting a plurality of mirror units having freedom of substantial universal articulation thereon, each of the plurality of mirror units carrying at an upper portion thereof reflective element trained to receive incident rays of the sun and to focus reflection thereof to a desired focal point, adjustment structure operatively connected to the plurality of mirror units and disposed in a plane generally parallel to the first plane in which the support structure is disposed, the adjustment structure being shiftable to additional planes adjacent and generally parallel thereto to effect conjoint articulation of each of the mirror units at the support structure and thereby conjointly retrain the reflective element of each of the mirror units to receive incident rays of the sun and maintain reflection thereof on the focal point over the course of any day.

23 Claims, 20 Drawing Figures

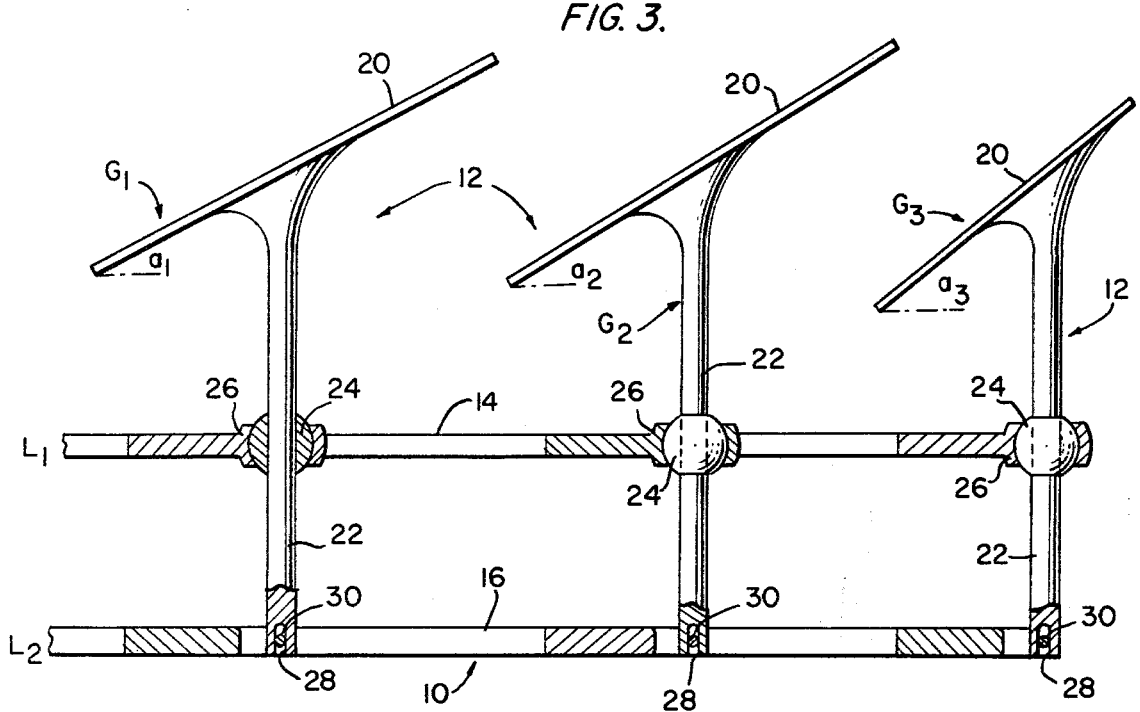
FIG. 3.
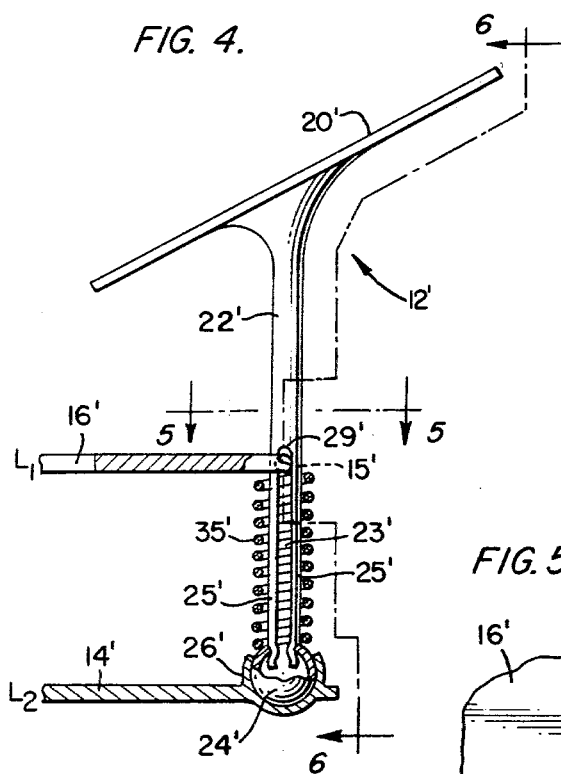
FIG. 4.
FIG. 5.
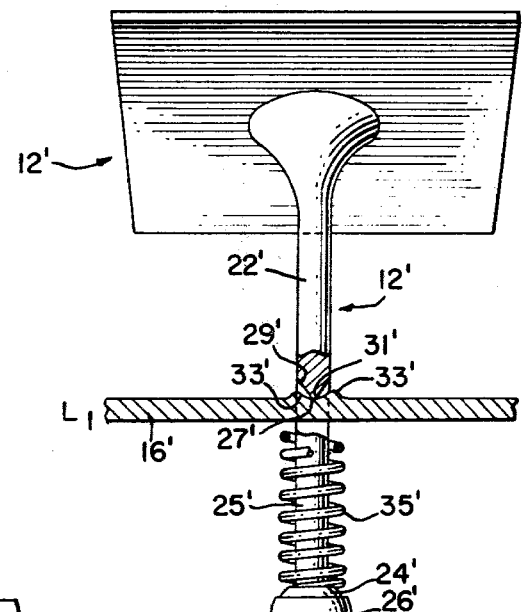
FIG. 6.
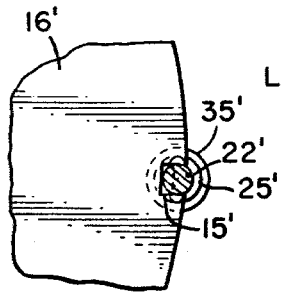

HELIOSTAT APPARATUS

This is a division of application Ser. No. 642,473, filed Dec. 19, 1975 now U.S. Pat. No. 4,110,009.

BACKGROUND OF THE INVENTION

1. Field of the Invention

The present invention relates to devices for harnessing solar energy and converting same to satisfy household and/or industrial energy requirements and in particular relates to heliostat construction.

2. Description of the Prior Art

With the advent of the fuel and energy crisis in the past few years, a re-examination of the prior art and renewed and concentrated endeavors to harness solar energy have been prime targets of the scientific community. Exemplifying the prior art devices of the class to which the present invention appertains are the constructions disclosed in U.S. Pat. Nos. 2,471,954 [Harvey] and 3,466,119 [Francia]. Notwithstanding the existence of voluminous prior art relevant to solar energy devices, such devices have not heretofore been put to use on a large scale. Rather it is the general consensus that the known solar devices are not commercially feasible for various reasons. The prior art devices of this type have failed to gain commercial acceptance for reasons such as the exorbitant initial cost of manufacture of complex systems, the great amount of space required for such systems, and the low rate of efficiency of such systems among numerous other reasons. Needless to say, the solar heat concentrating devices of the Harvey and the Francia patents, mentioned above, include many linkages, levers and complex arrangements of mechanical elements, which to say the least may require extensive maintenance and upkeep

SUMMARY OF THE INVENTION

The present invention provides a new and improved heliostat apparatus for concentrating solar energy and comprises a plurality of mirror units trained to receive incident rays of the sun and to focus reflection thereof to a desired focal point. The mirror units are mounted on a support structure in such a manner that each mirror has freedom of substantial universal articulation. Adjustment structure is provided to effect conjoint articulation of each mirror unit to thereby conjointly retrain the mirror units to receive incident rays of the sun and maintain reflection thereof to the desired focal point over the course of each day.

OBJECTS OF THE INVENTION

It is an object of the present invention to provide a new and improved solar concentrator of sufficiently high efficiency as to gain commercial acceptance.

It is also an object of the present invention to provide a new and improved solar concentrator which will require an appreciable lesser amount of space than the known prior art devices of this type.

It is a further object of the present invention to provide a new and improved solar concentrator which will require comparatively fewer parts than the known prior art devices of this type.

It is another object of the present invention to provide a new and improved solar concentrator which will be simpler in operation than the known prior art devices of this type.

It is yet another object of the present invention to provide a new and improved solar concentrator having a generally low profile which will readily blend in with existing structure in an unobtrusive manner.

It is moreover an object of the present invention to provide a new and improved solar concentrator suitable for installation in private homes to supply the heat requirements thereof.

It is yet a further object of the present invention to provide a new and improved solar concentrator that is readily adaptable to accommodate obstructions on a roof including line-of-sight obstacles such as chimneys or the like.

BRIEF DESCRIPTION OF THE DRAWINGS

FIG. 3 is an elevational view of several units of FIG. 2 on an enlarged scale;

FIG. 4 shows an elevational view of an alternative form of the units in FIG. 3;

FIG. 5 is a sectional view taken along section 5—5 in FIG. 4;

FIG. 6 is a sectional view taken along section 6—6 in FIG. 4;

DETAILED DESCRIPTION OF THE INVENTION

Figure 1:
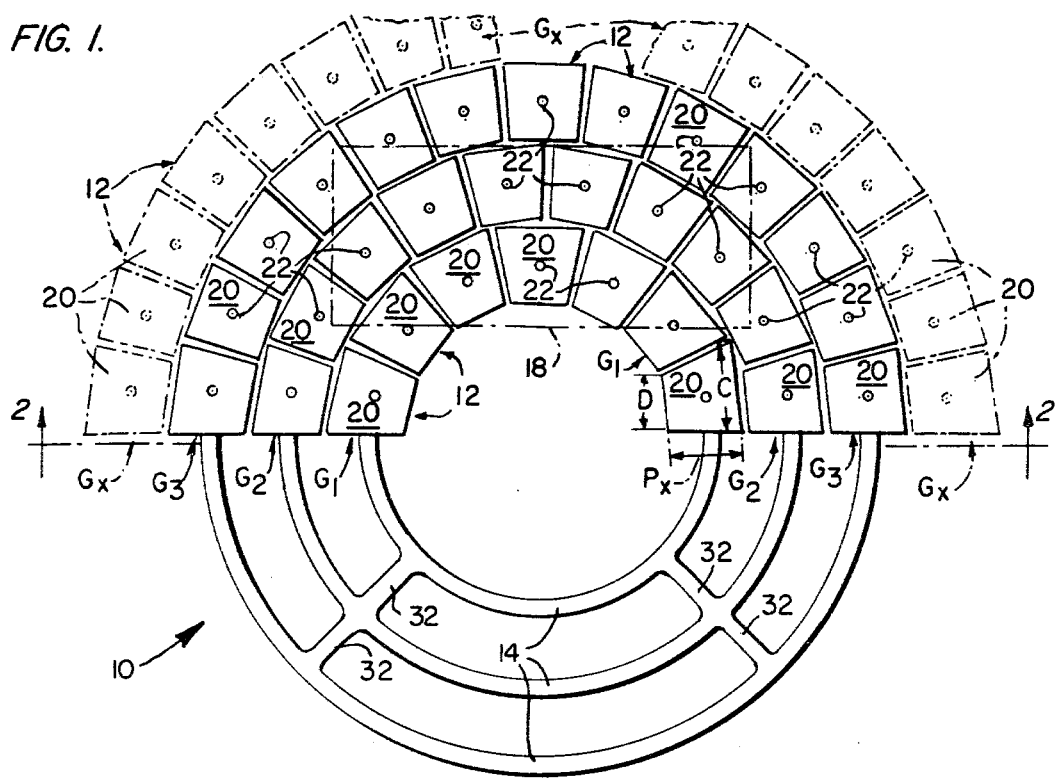
FIG. 1 shows a plan view of a schematic layout of a partially assembled heliostat apparatus according to one form of the present invention.
Figure 2:
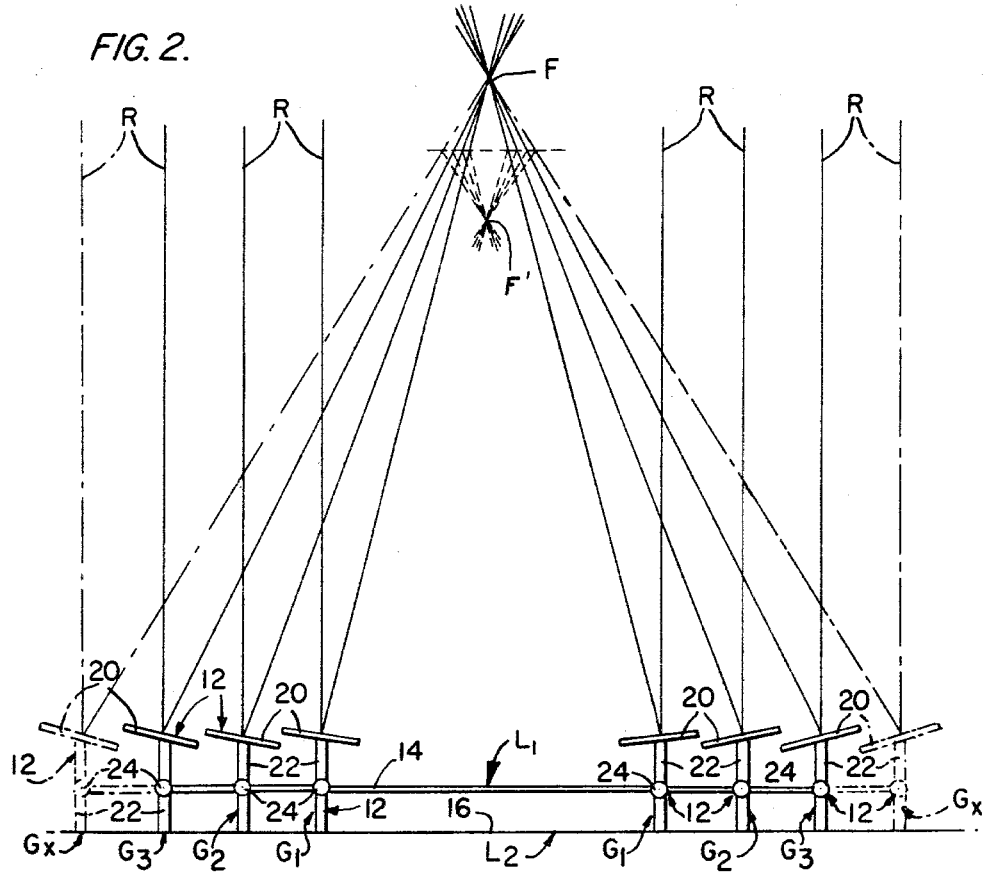
FIG. 2 is a sectional view taken along section 2—2 of FIG. 1.

Referring now in particular to the drawings, the reader will readily appreciate that one form of the present invention is embodied in the heliostat apparatus 10 depicted in FIGS. 1-3 as comprising a plurality of groups $G_1$, $G_2$, and $G_3$ of mirror units 12, each of which is operably connected to a common support structure 14 and a common adjustment structure 16. While three groups of mirror units 12 are illustrated, it is clearly within the contemplation of this invention to have fewer or more groups $G_x$ than as illustrated. As best seen in FIG. 1 the mirror units 12 of each of the groups $G_1$, $G_2$, and $G_3$ are arranged in generally arcuate paths. In the completely assembled form of the heliostat apparatus 10, the mirror units 12 of each of the groups $G_1$, $G_2$, and $G_3$ may be arranged in closed arcuate paths, in semi-circular paths, in an array confined by a generally rectangular outline 18, or in arcuate paths with the portion of outline 18 omitted.

Each mirror unit 12 includes an upper reflection surface 20 trained or directed in an upwardly facing direction to receive incident rays R of the sun and to focus the reflection thereof to a focal point or spot F thus concentrating solar energy thereat. In carrying forth the objectives of the present invention, each mirror unit 12 is provided with a generally vertically extending rigid upright 22 extending downwardly from the underside of reflective surface 20. Each upright 22 has a ball portion 24 extending therearound and secured thereto. Each ball portion 24 is disposed in a socket 26 formed in the common support structure 14 for universal movement therein. A slot 28 is formed at the lower end of each upright 22 and arranged to straddle a pin 30 or like member provided on common adjustment structure 16. The lower end of each upright 22 is further secured to common adjustment structure 16 and thus constrained to be shifted thereby.

According to the present invention the reflective surface 20 of each mirror unit 12 in a first group $G_1$ is disposed at one and the same given angle $a_1$ with the horizontal so that incident rays R of the sun are reflected and focused upon a selected point or spot F; and the reflective surfaces 20 of mirror unit 12 in second and third groups $G_2$ and $G_3$ are disposed at the second and third given angles $a_2$ and $a_3$, respectively, to reflect and focus incident rays R of the sun upon the same selected focal point F.

Figure 11:
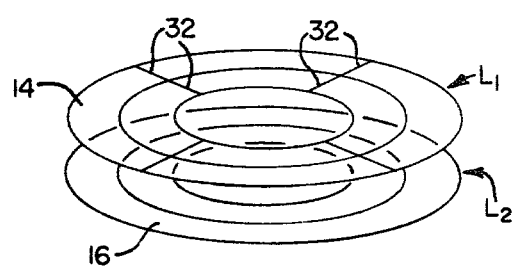
FIG. 11 is a view in perspective showing the general location of support and adjustment portions of the apparatus of FIGS. 1 and 2.

Referring to FIG. 11, the reader will readily see that common support structure 14 is depicted by a plurality of concentric rings at a level $L_1$ and the common adjustment structure 16 depicted by a plurality of concentric rings at a level $L_2$ parallel to the level $L_1$. Referring back to FIG. 1 the concentric rings of common support structure 14 are seen to be structurally connected by rigid spokes 32. It is to be understood that the concentric rings of common adjustment structure 16 are rigidly connected to each other in a manner similar to that in which the concentric rings of common support structure 14 are interconnected.

With the heliostat apparatus 10 constructed as described above, it is clear that with common support structure 14 fixedly secured in a given plane, any motion imparted to common adjustment structure 16 will effect conjoint articulation of each upright 22 of each mirror unit 12 of each of the groups $G_1$, $G_2$, and $G_3$ and consequently each reflective surface 20 by the same amount so that the difference between the angles $a_1$, $a_2$, and $a_3$ will remain constant. Thus as the sun shifts its position with respect to the earth in the course of the day, each mirror unit 12 of the heliostat apparatus 10 may be shifted to follow the sun in such a way that incident rays R of the sun may be continuously retrained to reflect and focus upon the same selected focal point or spot F. It is clear that common adjustment structure 16 may be manually shifted to retrain the reflective surfaces 20 to reflect and focus upon the same focal point F by applying horizontal forces thereon in the proper direction; however, it is envisioned that heliostat apparatus 10 be adapted to be used in combination with motorized actuators and computerized follower mechanism. For example, fluid motor means may be secured to common adjustment structure 16 at three or four locations 120° or 90° apart, respectively, so that any horizontal force applied to common adjustment structure 16 will effect conjoint pivotal movement of each upright 22 by reason of articulation of ball portion 24 in the respective socket 26 with common adjustment structure 16 moving toward or away from common support structure 14, but remaining parallel thereto. From the foregoing it is clear that as each upright 22 is pivoted, reflective surfaces 20 at the upper end of the upright 22 will also be shifted conjointly.

Because each mirror unit 12 is supported for substantially complete universal articulation on common support structure 14 by ball and socket members 24, 26 and is further operably connected to each and every other mirror unit 12 by common adjustment structure 16, significantly greater efficiency is attainable with the heliostat apparatus 10 formed thereby since the entirety of each reflective surface 20 may be continuously directed to reflect and focus upon one and the same point or spot. Favorable results are attainable in particular when the reflective surfaces 20 comprise a great number of small reflective surfaces in contrast to a smaller number of larger reflective surfaces. Where larger or elongate reflective units are used, lower efficiency would be obtained since it would be difficult to provide universal pivot joints for larger or elongate reflective surfaces of such units.

In a preferred embodiment of the present invention as represented in FIGS. 1–3, the reflective surface 20 of each mirror unit 12 includes an outer circumferential length C, an inner circumferential length D, and radial edges having projected length $P_x$ on a horizontal plane of which C is equal to $P_x$ for all mirror units 12 whether in the same or in different groups $G_1$, $G_2$, $G_3$; D is equal in the case of all mirror units 12 in the same group, but different from group to group; and D is less than C for all mirror units 12. The mirror units 12 as described above need only be spaced at a slight gap from adjacent mirror units 12 in the same group $G_1$, $G_2$, or $G_3$, which gap is to be only slightly more than the thickness of the reflective surface 20 at the edge. Similarly, $P_x$ may be only slightly less than the separation between centers of support bearings of adjacent groups $G_1$, $G_2$, $G_3$. The actual length of C should be as great as possible but should be less than half the minimum linear dimension of the area onto which reflected rays are focused. In the foregoing arrangement which is adapted to follow movement of the incident rays of the sun which upon moving through an angle X, for example, each mirror unit 12 will be moved through an angle X/2 in the same direction to maintain reflection of focus of incident rays R upon focal point or spot F. Because each mirror unit 12 is interconnected to a common support structure 14 and are also conjointly shiftable by a common adjustment structure 16, movement of one mirror unit 12 to maintain reflection of incident rays R of the sun on focal point or spot F will be accompanied by movement of all other mirror units 12 in unison to maintain reflection of incident rays R of all mirror units 12 upon focal spot F.

While common support structure 14 is illustrated as being at upper level $L_1$ and common adjustment structure 16 is at lower level $L_2$, it is within the concept of the invention that the levels $L_1$ and $L_2$ for these structures may be interchanged. Further, while only support structure 14 is illustrated as including ball and socket members, adjustment structure 16 may also include articulating ball and socket members. In light of the foregoing considerations, an alternative form to mirror unit 12 is illustrated in FIGS. 4-6 as mirror unit 12' which includes a reflective surface 20' on an upright 22' having a slot 23' forming two legs 25' of which one leg may be inserted into an opening 15' in a shiftable common adjustment member 16' at an upper level $L_1$. At the lower end of legs 25' is secured a ball 24' disposed in a socket 26' formed on common support structure 14' fixed at lower level $L_2$. Ball 24' is disposed in socket 26' for general universal articulation therein. With support structure 14' fixed at level $L_2$, any shifting movement of adjustment member 16' will necessarily be both horizontal and vertical in nature with tilting of upright 22' and mirror unit 12' and articulation of ball 24' in socket 26'. Tilting action of upright 22' is further controlled by confinement of a bevel edge 27' at the crotch 29' of slot 23' with the edge 27' riding on a valley 31' between twin peaks 33' on the upper surface of adjustment member 16'. To support the weight of common adjustment member 16' and ensure firm contact between edge 27' and valley 31', a coil spring 35' is disposed around legs 25' and against ball 24' and the underside of adjustment member 16'. It is also noted that within the scope and contemplation of the present invention common adjustment structure 16' may comprise a plurality of interconnected concentric polygonal members.

Figure 7:
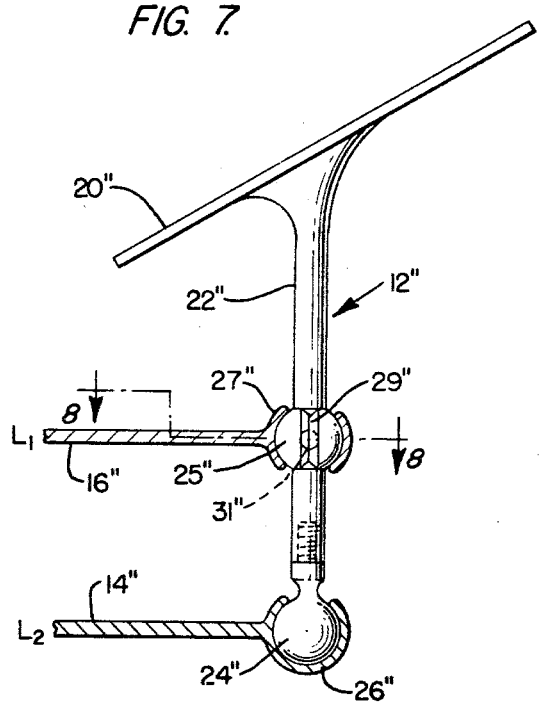
FIG. 7 shows an elevational view of a second alternative form of the units in FIG. 3.
Figure 8:
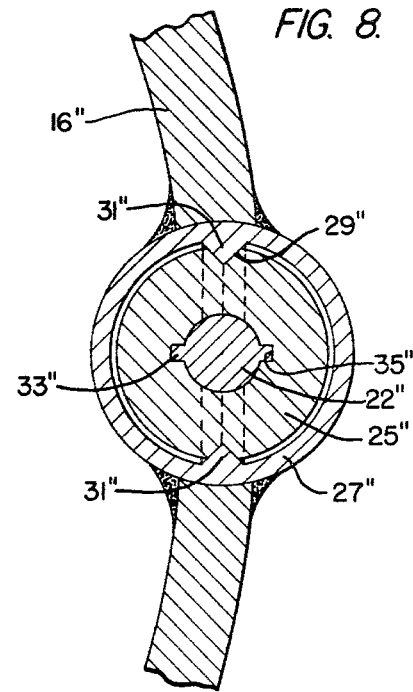
FIG. 8 is an enlarged view of a sectional view taken along section 8—8 in FIG. 7.

As another alternative form of mirror unit 12 and mirror unit 12' FIGS. 7 and 8 depict a mirror unit 12'' which includes a reflective surface 20'' on an upright 22'' rotatably supported in a common support structure 14'' fixed either at an upper level $L_1$ or at a lower level $L_2$, but fixed at lower level $L_2$ for purposes of discussion. Consistent with the options of support structure 14'' shiftable common adjustment structure 16'' may be disposed either at a lower level $L_2$ or at an upper level $L_1$, but disposed at upper level $L_1$ for purposes of discussion. At the lower end of each upright 22'' in the vicinity of level $L_2$ a ball 24'' is provided in universal articulating relationship within socket 26'' of common support structure 14''. At the vicinity of the plane of $L_1$, a ball 25'' is disposed around each upright 22'' in articulating relationship within a socket 27'' formed on common adjustment structure 16''. A circumferential groove 29'' extending in a generally vertical plane is formed on ball 25'' in which one or more projections 31'' extend radially inwardly from socket 27''. In this relationship projections 31'', which are conical in shape, cooperate with groove 29'' to permit relative rotation between ball 25'' and socket 27'' about an axis normal to the plane of groove 29'' and to permit no rotation between ball 25'' and socket 27'' about the axis of the mirror unit 22''. As clearly seen in FIG. 8 one or more radial protuberances 33'' extend outwardly from upright 22'' in a generally horizontal plane into notches 35'' provided in ball 25'' whereby relative rotation between upright 22'' and ball 25'' about the axis of upright 22'' is precluded. With the relationships between upright 22'', ball 25'' and socket 27'', it is clear that relative rotation between reflective surface 20'' and adjustment structure 16'' about the axis of upright 22'' is precluded.

Figure 9:
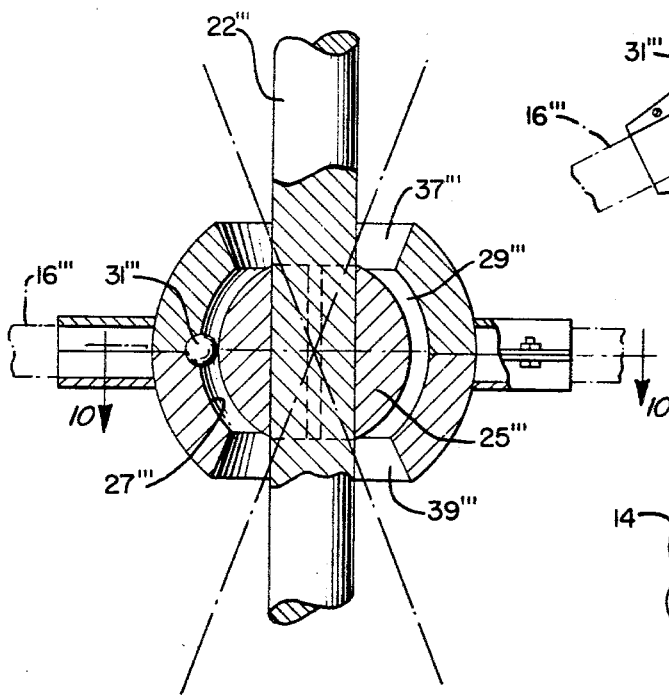
FIG. 9 is an enlarged view in section of an alternative joint construction for that which is illustrated in FIGS. 7 and 8.
Figure 10:
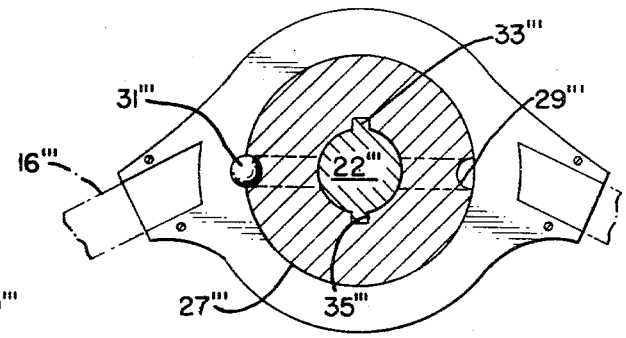
FIG. 10 is a sectional view taken along section 10—10 in FIG. 9.

An alternative embodiment of the arrangement of ball 25'' and socket 27'' of FIGS. 7 and 8 appears on an enlarged scale in FIGS. 9 and 10 in which each upright 22''' is provided with a ball 25''' therearound at level $L_1$, for example. Ball 25''' includes one or more notches 35''' in which radial protuberances 33''' of upright 22''' are received to preclude relative rotation between upright 22''' and ball 25'''. Each ball 25''' is rotatably disposed within a socket 27''' attached to a common support structure 16'''. A groove 29''' is formed in the surface of ball 25''' as a great circle thereof in a generally vertical plane. As clearly illustrated in FIG. 10, groove 29''' is semicircular in cross section. A member projecting radially inwardly from socket 27''' into groove 29''' in the form of a sphere 31''' prevents rotation between socket 27''' and ball 25''' about the axis of upright 22''', but permits rotation of ball 25''' about an axis normal to the plane of groove 29''' through which sphere 31'''. With the foregoing arrangement it is clearly seen that relative rotation between each upright 22''' and adjustment structure 16''' is precluded about the axis of upright 22''', but is permitted into any of various positions as indicated in dotted outline in FIG. 9. Polar bores 37''' and 39''' are formed at the upper and lower surfaces of socket 27''' to provide clearance for tilting of upright 22'''.

Figure 12:
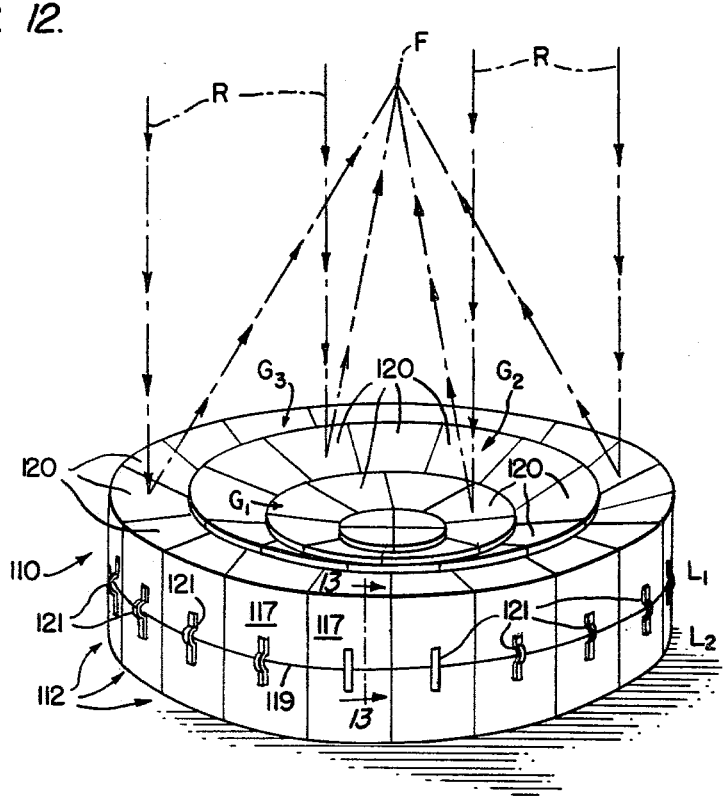
FIG. 12 is a view in perspective showing another alternative embodiment according to the present invention.
Figure 13:
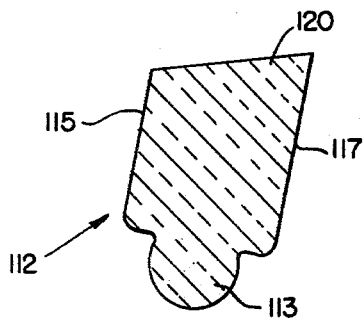
FIG. 13 is a sectional view in elevation taken along section 13—13 in FIG. 12.

An alternative embodiment according to the present invention appears in FIG. 12 in the form of heliostat apparatus 110 which comprises a plurality of annular groups $G_1$, $G_2$, $G_3$ of mirror units 112 each of which are in generally block form with inclined reflective surfaces 120 at the upper end thereof. The grouping of the mirror units 112 and general arrangement of the respective reflective surfaces 120 thereof are in accord with those discussed in connection with FIGS. 1 and 2. Each mirror unit 112 as seen in cross section in FIG. 13 includes a ball portion 113 at the base thereof, a radially inner wall 115, a radially outer wall 117, along with the upper reflective surface 120. Inner and outer walls 115, 117 are generally concentric to each other and ball portion 113 is adapted to be rock on or in a support member or surface. Each inner wall 115 according to the arrangement of heliostat apparatus 110 is in contact with an outer wall 117 of a mirror unit 112 inwardly thereof except, of course, in the case of mirror units 112 in the innermost group. Similarly, each outer wall 117 is in contact with an inner wall 115 of a mirror unit 112 outwardly thereof except in the case of mirror units 112 in the outermost group. Each mirror unit 112 further includes a pair of radial sidewalls in contact with a radial sidewall of a unit 112 on opposite sides thereof. To maintain continuous contact between various inner and outer walls 115, 117 as well as the various radial sidewalls of the mirror units 112 a resilient tensioned band or cable 119 extends around the outer walls 117 of each unit 112 on the outer group $G_3$. With the reflective surfaces 120 of all mirror units 112 preset at angles as described in connection with heliostat apparatus 10 of FIGS. 1-3, so that incident rays R of the sun are reflected to and concentrated at a desired focal point or spot F, it is clear that movement of any one mirror unit 112 to follow the incident rays of the sun to maintain reflection thereof on the desired spot F will necessarily effect movement of all other units 112 due to motion transmitted between all contacting inner and outer walls 115, 117, and all contacting sidewalls of all mirror units effected by tensioned band 119 and tilting movement of all mirror units 112 about the respective ball portions 113 in or on a support surface that would be fixed. To maintain stability of band 119, a positioning loop 121 through which band 119 is passed is provided on the outer wall 117 of each mirror unit 112 in the outer group G₃. In the arrangement of the various mirror units 112 of heliostat apparatus 110, cable or band 119 is at upper level L₁, whereas ball portions 113 are at lower level L₂ in or on a fixed surface. To adjust the reflective surface 120 of any one mirror unit 112 and consequently all reflective surfaces 120 of all mirror units 112 of heliostat apparatus 110 and thereby maintain reflection of incident rays R of the sun continuously focused at spot F, it is only necessary to apply sufficient force upon the outer wall 117 in the direction in which the sun has moved therefrom to cause tilting of each unit 112 about ball portions 113 by half the angle traversed by the sun.

Figure 14:
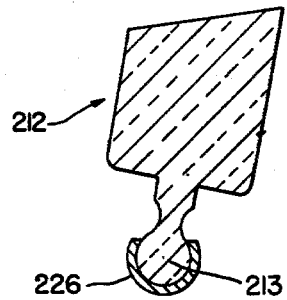
FIG. 14 is a sectional view in elevation of an alternative form of the unit of FIG. 13.

An alternative form of mirror unit 112 appears in FIG. 14 and is designated by reference number 212. Mirror unit 212 which is generally similar to mirror unit 112 differs from the latter in that ball portion 213 thereof is pivotally held in a socket 226, which may be part of a fixed support.

Figure 15:
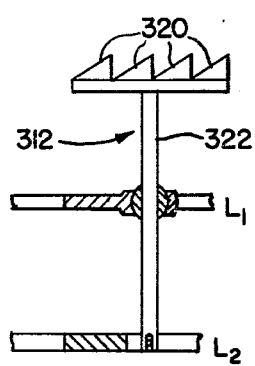
FIG. 15 shows an elevational view of yet another alternative form of the units in FIG. 3.
Figure 16:
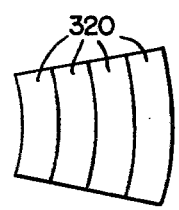
FIG. 16 is a plan view of FIG. 15.

A further alternative form to mirror unit 12 appears in FIGS. 15 and 16 as mirror unit 312 having an upright 322 with a plurality of reflective surfaces 320 secured to the upper end thereof. Each reflective surface 320 is arranged at a preset angle from the horizontal. At level L₂ adjustment member 316 may be shifted to effect tilting of upright 322 within socket 326 of support structure 314.

Figure 17:
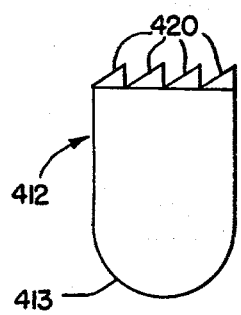
FIG. 17 shows an elevational view of an alternative form of the unit in FIG. 13.

Another embodiment alternative to mirror unit 112 may be seen in FIG. 17 as a mirror unit 412 formed with a hemisphere base portion 413 and have a plurality of reflective surfaces 420 arranged at a preset angle to the horizontal at the upper end thereof.

Figure 18:
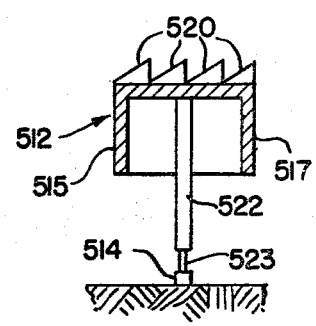
FIG. 18 shows an elevational view of yet another alternative form of the unit in FIG. 13.

A further mirror unit 512 may be seen in FIG. 18 as an alternate form of mirror unit 112. Mirror unit 512 comprises a plurality of inclined reflective surfaces 520 at the upper end thereof, inner and outer walls 515, 517, and side walls for operation as corresponding walls of mirror unit 112. Mirror unit 512 further includes an upright 522 having a yieldable spring portion 523 connected to a fixed support 514 so that any force applied to any of the walls of unit 512 may be transmitted to adjacent walls in contact therewith. Because of the resilient connection provided between upright 522 and fixed support 514 by spring portion 523, the upper part of mirror unit 512 will have the capacity for tilting movement about support 514 in a universal motion so that the inner and outer walls 515, 517, and the side walls of mirror unit 512 function as adjustment members for adjacent mirror units 512 having wall portions in contact therewith.

Figure 19:
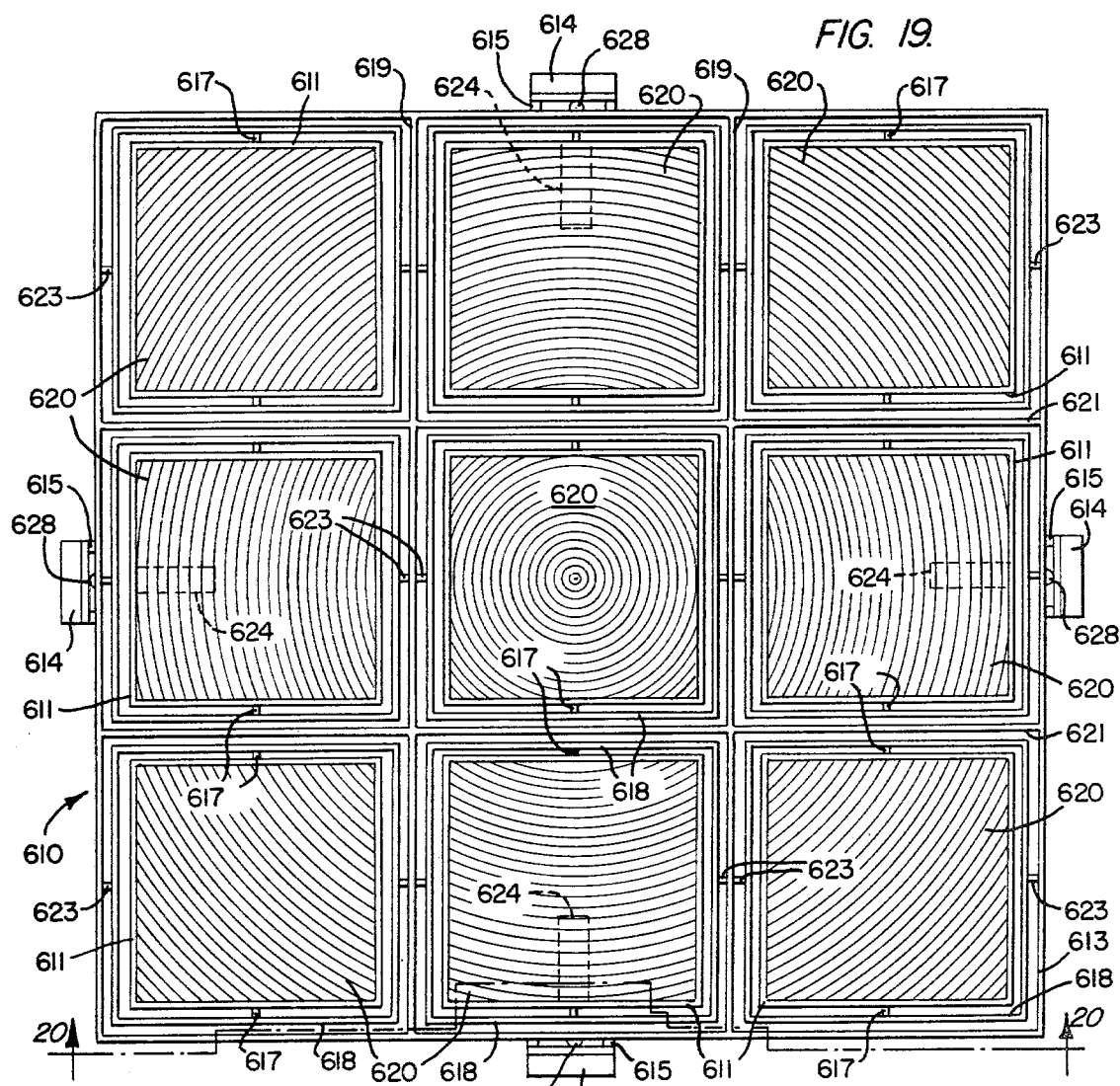
FIG. 19 is a plan view of yet another alternative embodiment according to the present invention.
Figure 20:
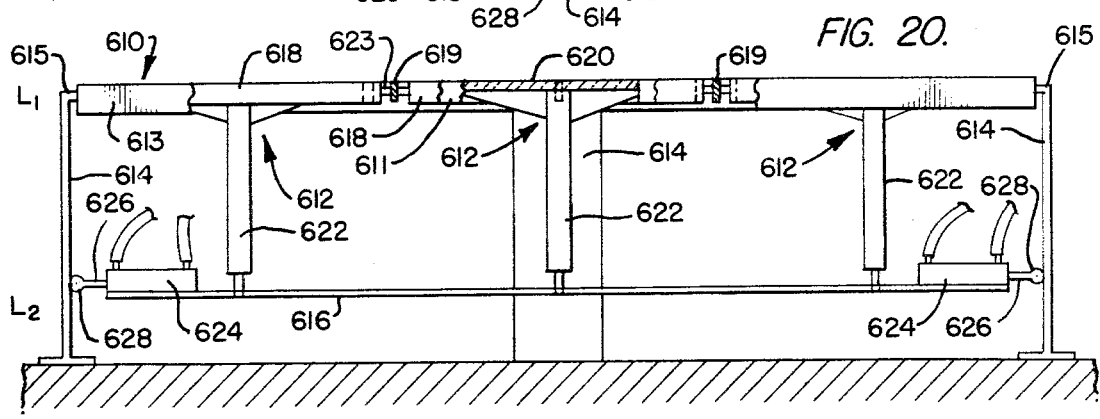
FIG. 20 is a sectional view in elevation taken along section 20—20 in FIG. 19.

Another embodiment of the invention appears in FIGS. 19 and 20 as an alternative to those disclosed in FIGS. 1 and 2 and in FIG. 12 in the form of heliostat 610, which comprises a plurality of mirror units 612. Each mirror unit 612 includes a head 611 pivotally assembled on a frame 613 secured to a common support structure 614 at an upper level L₁ by rigid connector elements 615. The head 611 of each mirror unit 612 includes a reflective surface 620 similar in construction and arrangement as the corresponding reflective surfaces 20 and 120 of the mirror units 12 and 112, respectively, as described above to focus and concentrate reflections of incident rays of the sun to a desired point of spot F. To facilitate movement for following the sun, each head 611 has a pair of gimbels 617 on opposite sides thereof which extend into a rigid surrounding mounting bracket 618 to provide a pivotal relationship between head 611 and bracket 618. Frame 613 includes a first set of support rods 619 and a second set of stabilizing rods 621 which are integral with and cross each of the support rods 619. Each mounting bracket 618 has a pair of gimbels 623 on opposite sides thereof which are at right angle to gimbels 617 and extend into frame 613 and/or support rods 619 to provide a pivotal relationship between head 611 and frame 613. With the foregoing arrangement, it is clear that each mirror unit head 611 and consequently each reflective surface 620 is afforded pivotal relationship with respect to frame 613 along two axes which are at right angle to each other. Each mirror unit 612 also includes an upright 622 pivotally connected to a common adjustment structure 616 at a lower level L₂. Rigidly secured to adjustment structure 616 are a plurality of ram devices 624 each of which includes an outwardly extending rod 626 with a universally rotatable ball 628 on the end thereof. The rams devices 624 may be of the fluid cylinder type, for example, and are so arranged that movement of the rod 626 of one ram device 624 will encounter no interference from the others and in fact may be coordinated with that of one or more of the other ram devices 624. For example, the ram devices 624 may be considered in FIG. 19 as being in coordinated pairs in the north-south positions and in the east-west positions wherein inward movement of the rod 626 of one ram device 624 of a coordinated pair of ram devices 624 will be accompanied by outward movement of the rod 626 of the other ram device 624 by the same magnitude, but with no inward or outward movement of the rods 626 of rams 624 of the other coordinated pair. Coordinated operation of each pair of ram devices 624 is effected by fluid connection between the supply and exhaust of one ram device 624 to the exhaust and supply, respectively, of the other ram device 624, with suitable controls. It is clear that balls 628, which are provided on the end of each rod 626, will because of their universal action effect independence between one coordinated pair of ram devices 624 and the other coordinated pair of ram devices 624. In operation each ball 628 is disposed against an abutting surface of support structure 614 with the balls 628 of one pair of ram devices 624 being rolled along the abutting surfaces 614 thereof as the rods 626 of the other pair of ram devices 624 move in and out, respectively, but will all balls 628 being maintained in continuous contact with the respective abutting surfaces 614 thereof.

With the arrangement in FIG. 19 movement of the rods 626 of the north-south rams 624 will effect conjoint tilting of reflective surfaces 620 of heliostat apparatus 610 about gimbels 623 whereas movement of the rods 626 of the east-west rams 624 will effect conjoint tilting of reflective surfaces 620 about gimbels 617. Each upright 622 as assembled with adjustment structure 616 will be tilted from the vertical position illustrated in FIG. 20 and adjustment structure 616 will be raised and/or lowered when rods 626 of at least one coordinated pair of rams 624 are moved in the cylinders thereof to effect a conjoint corrective or retraining movement of the reflective surfaces 620 of all mirror units 612 to maintain reflection of the sun's rays at point F. As adjustment structure 616 is shifted, each ball 628 in effect rides up or down and/or horizontally on the respective abutment surface 614 with continuous contact maintained therebetween.

While several embodiments of the present invention have been illustrated and described herein, numerous other variations or modifications thereof may occur to those having skill in the art and what is intended to be covered herein is not only the illustrated forms of the invention, but also any and all modified forms thereof as may come within the spirit of said invention.

What is claimed is:

1. Heliostat apparatus for concentrating solar energy comprising support means disposed in a first plane and supporting a plurality of mirror units having freedom of substantial universal articulation thereon, each of said plurality of mirror units carrying at an upper portion thereof reflective means trained to receive incident rays of the sun and to maintain reflection thereof in a desired substantially fixed direction, said plurality of mirror units are arranged in a plurality of groups with at least a first group including a number of mirror units situated along a first arcuate path and a second group including a number of mirror units situated along a second arcuate path generally concentric to said first arcuate path, adjustment means operatively connected to said plurality of mirror units and disposed in a plane generally parallel to said first plane in which said support means are disposed, said adjustment means being shiftable in linear displacement to additional planes adjacent and generally parallel thereto to effect substantially universal displacement of each of said mirror units responsive to said linear displacement of said adjustment means at said support means thereby conjointly retrain the reflective means of each of said mirror units to receive incident rays of the sun and maintain reflection thereof in said substantially fixed direction over the course of any day.

2. The apparatus as defined in claim 1 wherein the plurality of mirror units of said first group have reflective surfaces at upper portions thereof all extending at the same angle with the horizontal and the plurality of mirror units of said second group have reflective surfaces at upper portions thereof all extending at the same angle with the horizontal but different from that at which the reflective surfaces of said first group extend with the horizontal.

3. The apparatus as defined in claim 2 wherein said first plane of said support means is situated above said adjustment means and said support means comprise a plurality of sockets with balls free to articulate therein, and each of said balls is disposed on one of said mirror units and facilitates substantial universal articulation of said mirror units.

4. The apparatus as defined in claim 3 wherein each of said mirror units includes a lower portion extending below said first plane down to and connected to said adjustment means whereby any shift in position of said adjustment means will effect an equal change in the angle at which all the reflective surfaces of said apparatus extend with the horizontal whether such change be increase or decrease.

5. The apparatus as defined in claim 4 wherein said first and second arcuate paths along which said plurality of groups of mirror units extend are substantially circular paths and said adjustment means include rigidly interconnected concentric circular portions coaxial with said circular paths.

6. The apparatus as defined in claim 5 wherein said support means also includes rigidly interconnected concentric circular portions coaxial with said circular paths.

7. The apparatus as defined in claim 6 wherein said lower portion of each of said mirror units is interconnected to said adjustment means by a yoke extending in a slot in said adjustment means and straddling a pin fixed on said ajustment means.

8. The apparatus as defined in claim 7 wherein said reflective surfaces of said mirror units comprise a single flat mirror for each unit.

9. The apparatus as defined in claim 7 wherein said reflective surfaces of said mirror units comprise a plurality of flat mirrors for each unit.

10. The apparatus as defined in claim 2 wherein said first plane of said support means is situated below said adjustment means.

11. The apparatus as defined in claim 10 wherein said support means comprise a plurality of sockets with balls free to articulate therein and each of said balls is disposed on one of said mirror units and facilitates substantial universal articulation of said mirror units.

12. The apparatus as defined in claim 11 wherein each of said mirror units includes an intermediate portion situated above said first plane and connected to said adjustment means whereby any shift in position of said adjustment means will effect an equal change in the angle at which all the reflective surfaces of said apparatus extend with the horizontal whether such change be increase or decrease.

13. The apparatus as defined in claim 12 wherein said first and second arcuate paths along which said plurality of groups of mirror units extend are substantially circular paths and said adjustment means includes rigidly interconnected concentric circular portions coaxial with said circular paths.

14. The apparatus as defined in claim 13 wherein said support means also includes rigidly interconnected concentric circular portions coaxial with said circular paths.

15. The apparatus as defined in claim 14 wherein a coil spring extends around a portion of each of said mirror units and is disposed between said support means and said adjustment means to resiliently support the latter.

16. The apparatus as defined in claim 15 wherein said adjustment means includes valley surfaces between twin peaks on the upper side thereof on which a cooperating crotch formed on the intermediate portion of each of said mirror units may be rocked.

17. The apparatus as defined in claim 13 wherein said intermediate portions of each of said mirror units and said adjustment means are operatively connected by cooperating ball and socket members of which the ball members are each formed with a groove and locking means are formed on said adjustment means and extend in one of said groove to allow relative rotation of said ball and socket members except about the axes of said mirror units.

18. The apparatus as defined in claim 12 wherein said first group of mirror units comprise a first circumferential series of mirror units which are in abutment with adjacent mirror units and further have radially inner and outer cylindrical surfaces and said second group of mirror units comprise a second circumferential series of mirror units which are in abutment with adjacent mirror units and further have radially inner and outer cylindrical surfaces with said inner surfaces of said second series in abutment with said outer surfaces of said first series of mirror units, and with said adjustment means comprising a tensioned flexible cable extending around and secured to said outer surface of said second series of mirror units whereby movement of any one mirror unit will effect compound and conjoint movement of all mirror units through contact of abutting units and by constrainment by said tensioned flexible cable.

19. The apparatus as defined in claim 18 wherein said reflective surfaces of said mirror units comprise a single flat mirror for each unit.

20. The apparatus as defined in claim 18 wherein said reflective surfaces of said mirror units comprise a plurality of flat mirrors for each unit.

21. The apparatus as defined in claim 10 wherein said support means comprise a plurality of resiliently deformable rods having a lower portion secured in said first plane and an upper portion secured to each of said mirror units and said adjustment means comprising an upper portion disposed in said plane generally parallel to said first plane, said upper portion having a downwardly extending wall portion terminating short of said first plane, each of said mirror units together with the wall portion thereof being part of said first group of mirror units and said second group of mirror units, with said first group of mirror units further comprising a first series of mirror units with the wall portions thereof forming congruent sectors in cross-section and in abutment with adjacent mirror units of said first series, said second group of mirror units further comprising a second series of mirror units with the wall portions thereof forming congruent sectors in cross-section and in abutment with adjacent mirror units of said second series, said first and second series of mirror units further being adjacent and in abutment whereby deformation of any deformable rod of any one of said mirror units will effect compound and conjoint displacement of all other mirror units of said apparatus.

22. The apparatus as defined in claim 21 wherein said reflective surfaces of said mirror units comprise a plurality of flat mirrors for each unit.

23. The apparatus as defined in claim 12 wherein said first group of mirror units comprise a first circumferential series of mirror units which are in abutment with adjacent mirror units and further have radially inner and outer surfaces and said group of mirror units comprise a second circumferential series of mirror units which are in abutment with adjacent mirror units and further have radially inner and outer surfaces with said inner surfaces of said first series of mirror units, and with said adjustment means comprising a tensioned flexible cable extending around and secured to said outer surface of said second series of mirror units whereby movement of any one mirror unit will effect compound and conjoint movement of all mirror units through contact of abutting units and by constrainment by said tensioned flexible cable.

* * * * *